United States Patent

[11] 3,607,912

[72] Inventor James P. Russell
    Berkeley, N.J.
[21] Appl. No. 671,116
[22] Filed Sept. 27, 1967
[45] Patented Sept. 21, 1971
[73] Assignee Air Products and Chemicals Inc.
    Allentown, Pa.

[54] PREPARATION OF ALKYL ESTERS OF $\alpha,\beta$ UNSATURATED MONOCARBOXYLIC ACIDS
9 Claims, No Drawings

[52] U.S. Cl.......................................................... 260/486,
                                                                 260/347.8
[51] Int. Cl........................................................ C07c 69/52
[50] Field of Search............................................ 260/486

[56] References Cited
UNITED STATES PATENTS
2,891,990  6/1959  Mulvany.......................  260/486

Primary Examiner—Charles B. Parker
Assistant Examiner—Paul J. Killos
Attorneys—B. Max Klevit, Barry Moyerman and David T. Nikaido ABSTRACT: Lower alkyl esters of $\alpha,\beta$-unsaturated monocarboxylic acids are converted to higher esters by treatment with the appropriate higher alcohol in the presence of an alkaline esterification catalyst, and in the presence of about 0.05 to about 2.5 weight percent of water.

PREPARATION OF ALKYL ESTERS OF α,β UNSATURATED MONOCARBOXYLIC ACIDS

This invention relates to the preparation of higher esters of α,β-unsaturated monocarboxylic acids and more particularly to the conversion of the methyl ester of acrylic and methacrylic acids to higher alkyl esters of said acids.

Higher esters, e.g. aliphatic esters, of α,β-unsaturated monocarboxylic acids such as acrylic, methacrylic, crotonic, tiglic, angelic acids and the like are useful for a variety of purposes and are in substantial commercial demand. Such esters may be prepared by direct esterification of the α,β-unsaturated monocarboxylic acid with the appropriate alcohol. While direct esterification is a satisfactory method of forming the methyl ester of acrylic acid and the like, it is not a satisfactory method for forming higher esters either because of low yields or the formation of byproducts such as diesters and keto esters which have little utility.

In view of this, it has been preferred to form the methyl ester of the α,β-unsaturated monocarboxylic acid and then convert the same to the desired higher ester by a so-called "ester interchange" reaction or alcoholysis of the methyl ester with a higher aliphatic alcohol, e.g. a higher aliphatic alcohol or alkanol. It has been proposed to carry out this reaction in the presence of an acidic esterification catalyst such as sulfuric acid or p-toluene sulfonic acid in combination with a polymerization inhibitor, to control polymerization of the unsaturated esters. This process, however, has been subject to several disadvantages. The yields of higher esters have not been satisfactory, due to the formation of undesirable polymers. Careful control of reaction conditions has been necessary to avoid excessive formation of such undesirable polymers. Furthermore, emulsions are often formed which are difficult to separate resulting in further loss of the desired ester product.

It has been proposed in U.S. Pat. No. 2,891,990 to avoid the formation of excessive amounts of polymer and/or emulsions by carrying out the alcoholysis reaction in the presence of a basic esterification catalyst, preferably alcoholates of a metal such as sodium, potassium, lithium, calcium, magnesium or aluminum and a polymerization or oxidation inhibitor such as hydroquinone, ter.-butyl catechol, monomethyl ether of hydroquinone, p-hydroxy diphenylamine and the like. In this process, the molar equivalent ratio of polymerization inhibitor to catalyst is greater than one. In the companion U.S. Pat. No. 2,891,991 it is disclosed that substantial savings and improvement of the quality of the product in the above process may be effected by the use of a particular polymerization inhibitor, namely quinone, which is asserted to be effective in concentrations which are one one-hundredth to one twenty-fifth of those previously used with conventional inhibitors such as hydroquinone. The problem with all of these processes has been the cost of the polymerization inhibitor and the loss in yield of the desired higher aliphatic esters through the formation of polymers and byproducts which have little utility.

It is an object of this invention to provide a new and improved method for preparing higher esters of α,β-unsaturated monocarboxylic acids.

It is also the object of this invention to provide a new and improved method for converting methyl esters of α,β-unsaturated monocarboxylic acids to higher esters at a reaction rate of sufficient magnitude to operate on a continuous basis.

It is a further object of this invention to provide a new and improved process to achieve a maximum conversion of the methyl ester of acrylic or methacrylic acids to the corresponding ethyl ester with the formation of minimum amounts of β-alkoxyl propionate and polymer.

These and other objects will appear more clearly from the detailed specification which follows.

It has now been found that higher esters of α,β-unsaturated monocarboxylic acids can be prepared by reacting a lower ester, preferably the methyl ester, of said acids containing from about 0.05 to 2.50% water with a higher alcohol in the presence of an alkaline catalyst at relatively low temperatures and for short reaction periods. The small quantity of water under these reaction conditions serves to maintain the formation of undesired β-alkoxy saturated monocarboxylic acid esters below about 4.0% at the expense of slightly lower conversions to the higher α,β-unsaturated monocarboxylic acid esters.

The lower alkyl esters of α,β-unsaturated monocarboxylic acids which may be used in accordance with the present invention are the $C_1$ to $C_4$ alkyl esters of acrylic, methacrylic, crotonic, tiglic, methylcrontonic, ethylcrotonic, butylcrotonic, and sorbic acid, and like α,β-unsaturated monocarboyxlic acids containing up to 18 carbon atoms, as well as mixtures thereof. Lower alkyl esters of acrylic and methacrylic acids, and specifically methyl acrylate and methyl methacrylate, are the preferred materials on the basis of availability and effectiveness in the process.

The higher monohydric alcohols which may be used in the alcoholysis reaction of the present invention contain at least one more carbon atom than is contained in the alkyl group of the lower alkyl esters of the α,β-unsaturated monocarboxylic acids used. Such alcohols include ethanol, propanol, isopropanol, n-butanol, isobutanol, n-pentanol, 2-pentanol, cyclopentanol, n-hexanol, cyclohexanol, 2-ethylhexanol, octadecanol, benzyl alcohol, aminoethanol, furfuryl alcohol, and like alcohols containing up to 18 carbon atoms. The ratio of ester to alcohol utilized may vary from about 3:1 to about 1:2. In general, however, if the ester to alcohol ratio is below about 2:1, the amount of water used must be increased to control byproduct formation resulting also in lower conversion to the desired higher alkyl esters.

The catalysts that can be used in the process of the present invention are alkaline materials which are soluble in the reaction system such as sodium or potassium hydroxide and lower alcoholates of these alkali metals, such as sodium or potassium methylates or ethylates. The amount of catalyst used may vary from about 200 to about 1,500 p.p.m. It has been found that the conversion to higher esters is dependent upon catalyst concentration and is substantially unaffected by reaction time in the range of from about 5 to 30 minutes. The amount of high boiling residue also increases as the catalyst concentration is increased, and accordingly, the catalyst concentration is preferably limited so that the amount of high boiling residue formed does not exceed about 4.0%.

The use of alkaline catalysts in combination with water in accordance with the present invention causes the reaction system to equilibrate in about 3 to 5 minutes without excessive formation of byproducts. The short reaction time eliminates the need for large amounts of polymerization inhibitor, in fact it has been found that in 0.25 hrs. of reaction time, little or no polymeric material was formed even when the runs were made using inhibitor-free methyl acrylate. Polymerization inhibitors that may be used are phenolic compounds such as hydroquinone and its monoalkyl ethers, quinone, napthols, substituted phenols, tertiary butyl catechol and aryl amines such as diphenyl amine, p-hydroxydiphenyl amine, phenylene diamine, and the like. A preferred inhibitor is Universal Oil Products "Gasoline Inhibitor No. 1," a proprietory mixture of creosols derived from wood tar. The amount of polymerization inhibitor used may vary from about 0.001 to about 0.3%.

The reaction according to the present invention may be carried out at temperatures between about 30° to 90° C., preferably 50° to 80° C., at which the alcoholysis readily occurs, preferably at reflux temperature for the reaction mixture. It is preferred to carry out the reaction at substantially atmospheric pressure although subatmospheric as well as superatmospheric pressures can also be used. The reaction is carried out over a period of from about 5 to 30 minutes.

The crude reaction products are purified by conventional procedures to give the desired higher aliphatic esters, e.g. of acrylic and methacrylic acids. Since the reaction is ordinarily conducted at reflux temperatures, an azeotropic mixture of the lower alkyl ester feed stock along with the lower aliphatic alcohol formed by the alcoholysis reaction and/or inert hydrocarbon diluent can be removed directly from the reaction zone. This mixture can be washed with brine or other aqueous solution to recover the unreacted lower alkyl ester for recycle to the alcoholysis reaction. The reaction product mixture can be subjected to vacuum or extractive distillation in order to remove the excess lower alkyl ester feed stock for recycle to the alcoholysis reaction. The stripped crude reaction product can be washed with aqueous solutions to neutralize and/or remove polymerization inhibitor. It has been found that the addition of an inert hydrocarbon such as hexane in amounts equal to the weight of the reaction mixture exerts no adverse effect upon the reaction itself, thereby making any separation scheme based on hydrocarbon azeotroping practical.

The following examples are illustrative of the present invention. In the various experiments that were carried out, the reactor used was a 300 ml. three-necked flask fitted with a condenser, thermometer and dropping funnel. Stirring was effected with a 1-inch Teflon covered magnet driven by a "Mag-Mix" stirrer. Heating was provided by an electrically heated oil bath thermostatically controlled at 80°–85° C. At the end of the reaction period, the reactor flask was cooled by contact with an ice bath. When the temperature reached 10° C., the reaction mixture was removed from the reactor and titrated to a pH of 7.0. A portion of the neutralized reaction product was set aside for analysis by gas chromatography and 100 grams of the neutralized reaction product was transferred to a 200 ml. tared distillation flask attached to a 10-plate vacuum still and distilled at 150 mm. Hg to a pot temperature of 50° C. As the rate of distillation decreased, the pressure was lowered to 100 mm. Hg and the distillation was continued to a pot temperature of 70° C. whereupon distillation was continued for an additional 30 minutes. The still pot was then weighed and the weight of the high boilers determined. The volatile liquid trapped in the dry ice trap of the vacuum system was combined with the liquid in the distillation receiver and the weight of the volatiles determined. The material balance in this distillation procedure ranged from 99.2 to 99.5%

EXAMPLE I

In a typical run, a 10% solution of the catalyst in absolute ethanol was prepared, refluxing on an oil bath if necessary to effect complete solution. The water and/or polymerization inhibitor was dissolved in the methyl acrylate and placed in the magnetically stirred reactor and heated to the reaction temperature. The catalyst solution was pipetted into the ethanol feed, heated to 65°–70° C., and added rapidly to the acrylate solution. After heating for the desired time, the oil bath was removed and replaced with the ice bath and the products recovered as described above.

A study of conversions and yields of ethyl acrylate from methyl acrylate and ethanol as a function of time was made at a 3:1 mole ratio of methyl acrylate to ethanol, at 73° C. with NaOH as the catalyst, and at catalyst concentrations of 0.0067%, 0.0167%, 0.033%, and 0.067%. It was found that under any one set of conditions, equilibrium was independent of reaction time within the 5–30-minute time interval. The results obtained are summarized in table I.

TABLE I

| Catalyst Concentration % NaOH | Conversion Based on Ethyl Acrylate | Reaction Time Minutes |
|---|---|---|
| 0.0067 | 9.25% | 5–15 and 30 |
| 0.0167 | 23.00% | 5–15 and 30 |
| 0.033 | 31.50% | 5–15 and 30 |
| 0.067 | 42.00% | 5–15 and 30 |
| 0.067 | 41.00% | 3 to 5 |
| 0.067 | 33.00% | 1 |

As may be seen from table I, as catalyst concentration was increased, the equilibrium of the reaction

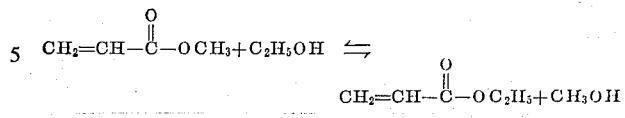

was moved to the right. This is contrary to a true catalytic effect, in that a catalyst affects the rate of the reaction but does not alter the equilibrium. The additional runs at less than 5 minutes reaction time showed that while equilibrium was not attained in 1 minute, it was reached in about 3 minutes. However, the 33% conversion attained in 1 minute indicates that even a 1-minute reaction time might be practical in a continuous process involving, for example, pumping the reaction mixture through a heat exchange reactor at such a rate that the residence time in said reactor would be in the range of from about 1 to 5 minutes and then passing the reaction mixture to a continuous extractive distillation unit using a glycol or other suitable extractant to separate the esters from the alcohols and passing the mixed esters taken overhead from the extractive distillation into a continuous still of sufficient plateage to separate the higher esters from the unreacted lower esters which could then be recycled. An alternate continuous procedure would be a vapor phase system in which a reactor tube is filled with a catalyst such as NaOH on an inert support and heated to 80° C. or higher. A mixture of the methyl ester, the higher alkanol, and water is vaporized and passed through the reactor tube at a suitable velocity to obtain the desired conversion whereupon it would be passed to product recovery and purifying means.

As may be seen from the above data, a catalyst concentration of 0.067% NaOH produced the highest conversion to ethyl acrylate. It is also possible to use higher catalyst concentrations. However, it was found that a run made with 0.20% NaOH gave 17% alkoxypropionate in spite of a conversion of 61%.

EXAMPLE II

A number of runs were made in the same way as in example I but at a low ratio of 1 mole of methyl acrylate to 2 moles of ethanol. In all of the runs the reaction temperature was 73° C. and the time was 15 minutes. The reaction conditions and the results obtained are summarized in table II.

TABLE II

| Catalyst | Water | Conversion | Residue |
|---|---|---|---|
| 0.067%NaOH | 0.05% | 48% | 20% |
| 0.067%NaOH | 0.15% | 52% | 11% |
| 0.067%NaOH | 0.25% | 51% | 11% |
| 0.067%NaOH | 0.45% | 44% | 6.5% |
| 0.067%NaOH* | 1.05% | 23.5% | 0.7% |
| 0.067%NaOH | 1.20% | 27% | 3.0% |
| 0.067%NaOH | 1.20% | 28.5% | 2.3% |
| 0.067%NaOH | 6.0% | 6.0% | 0.3% |

* in 178 g. hexane

As may be seen from these data, at a 1:2 mole ratio of the methyl acrylate to ethanol, more than about 0.5% water must be utilized to bring the formation of high boiling residue to a sufficiently low level and still maintain the conversion to ethyl acrylate in the range of about 25–30%. Moreover, the addition of an inert hydrocarbon, hexane, to the reaction mixture to facilitate azeotropic separation reduced ethyl acrylate yield slightly, but effected a substantial reduction in the yield of high boiling residue.

EXAMPLE III

A number of runs were also made in the same way as in example I at an equimolar ratio of methyl acrylate to ethanol. In these runs, the reaction temperature and time were the same as in example II, i.e. 73° C. and 15 minutes. The reaction conditions and those results obtained are summarized in table III.

TABLE III

| Catalyst | Water | Conversion | Residue |
|---|---|---|---|
| 0.067%NaOH | 0.05% | 42% | 26% |
| 0.067%NaOH | 0.15% | 33% | 8% |
| 0.067%NaOH | 0.25% | 31% | 7.0% |
| 0.067%NaOH | 0.30% | 30.5% | 6.5% |
| 0.067%NaOH | 0.60% | 27% | 3.0% |
| 0.067%NaOH | 2.70% | 10% | 0.3% |

As may be seen from the above data, at equimolar ratios of methyl acrylate to ethanol, amounts of water of from about 0.40% to about 0.65% are the preferred range for minimizing high boiling residue formation.

EXAMPLE IV

A large number of runs were made using the same procedure as in example I at a ratio of 3 moles of methyl acrylate to 1 mole of ethanol. The reaction conditions and the results obtained are summarized in table IV.

TABLE IV

| Catalyst, percent NaOH | Water, percent | Temp., °C. | Time, min. | Conversion, percent | Residue, percent |
|---|---|---|---|---|---|
| 0.067 | 0.05 | 73 | 15 | 64 | 10 |
| 0.067 | 0.10 | 73 | 15 | 35 | |
| 0.067 | 0.15 | 73 | 1 | 33 | 4.0 |
| 0.067 | 0.15 | 73 | 3-5 | 41 | 4.0 |
| 0.067 | 0.05 | 73 | 15 | 12.5 | 2.8 |
| 0.067 | 0.05 | 73 | 15 | 59 | 6.9 |
| 0.067 | 0.05 | 73 | 15 | 34 | 3.5 |
| 0.067 | 0.13 | 73 | 15 | 41 | 3.5 |
| 0.033 | 0.15 | 73 | 15 | 23 | 2.2 |
| 0.067 | 0.15 | 70 | 15 | 46 | 5.0 |
| 0.067 | 0.15 | 50 | 15 | 50 | 5.0 |
| 0.067 | 0.15 | ² 90 | 15 | 24.4 | 3.3 |
| 0.067 | 0.15 | ² 90 | 15 | 20.0 | 2.5 |
| 0.067 | 0.20 | 73 | 15 | 29 | 2.5 |
| 0.067 | 0.20 | 73 | 15 | 30 | 2.0 |
| 0.067 | 0.25 | 73 | 15 | 32 | 4.0 |
| 0.067 ¹ | 0.25 | 73 | 15 | 29 | 2.0 |
| 0.067 | 0.35 | 73 | 15 | 17 | 2.0 |
| 0.067 | 0.50 | 73 | 15 | 12 | 1.0 |

¹ In 152 g. hexane.
² 90° C. experiment conducted in an autoclave to contain 15-20 p.s.i.g. pressure developed.

It may be seen from the above data that when the mole ratio of methyl acrylate to ethanol is increased to 3:1, the reaction becomes increasingly sensitive to water content. Accordingly, mole ratios of acrylate to ethanol higher than 3:1 are disadvantageous.

It will be understood that this invention is not limited to these specific examples, since numerous variations will be apparent to those skilled in this art without departing from the scope of the following claims.

What is claimed is:

1. A process for preparing higher alkyl esters of acrylic and methacrylic acids which comprises reacting a member of the group consisting of methyl acrylate and methyl methacrylate with a higher alcohol of from 2 to 18 carbon atoms in an ester to alcohol mole ratio of about 3:1 to about 1:2 in contact with an alkali metal hydroxide esterification catalyst and in the presence of from about 0.05 to about 2.5 w/o of water sufficient to maintain the formation of high boiling residues below about 5%.

2. The process as defined in claim 1 in which the alkaline catalyst is selected from the group consisting of sodium and potassium hydroxides, the reaction temperature is between about 50° and 80° C. and the reaction time is between about 1 and 30 minutes.

3. The process is defined in claim 2 in which the ester feed is methyl acrylate and the higher alkanol is ethanol.

4. The process as defined in claim 3 in which the catalyst is sodium hydroxide.

5. The process as defined in claim 4 in which the mole ratio of methyl acrylate to ethanol is 1:2 and the amount of water is between about 0.5 to about 1.2 w/o.

6. The process as defined in claim 4 in which the mole ratio of methyl acrylate to ethanol is 1:1 and the amount of water is between about 0.4 and about 0.7 w/o.

7. The process as defined in claim 4 in which the mole ratio of methyl acrylate to ethanol is about 1:3 and the amount of water is between about 0.05 and 0.35 w/o.

8. A continuous process for preparing higher alkyl esters of acrylic and methacrylic acids which comprises feeding a mixture of a member of the group consisting of methyl acrylate and methyl methacrylate, a higher alcohol of from 2 to 18 carbon atoms and from about 0.05 to about 2.5 w/o water into the reaction zone, maintaining said mixture in contact with an alkaline esterification catalyst selected from the group consisting of sodium and potassium hydroxides, methylates and ethylates at a temperature between about 50° and 90° C. for from about 1 to 15 minutes, continuously discharging reaction mixture from said reaction zone and recovering the higher alkyl ester formed from the withdrawn reaction mixture.

9. A process for preparing higher esters of $C_1$ to $C_4$ alkyl esters of $\alpha,\beta$-unsaturated monocarboxylic acids containing up to 18 carbon atoms, which comprises reacting said last-named esters with a higher alcohol of from 2 to 18 carbon atoms in contact with an alkali metal hydroxide esterification catalyst and in the presence of from about 0.05 to about 2.5 w/o of water sufficient to maintain the formation of high boiling residues below about 5%.